United States Patent
Bell, Jr. et al.

(10) Patent No.: US 6,947,621 B2
(45) Date of Patent: Sep. 20, 2005

(54) ROBUST HETERODYNE INTERFEROMETER OPTICAL GAUGE

(75) Inventors: Raymond Mark Bell, Jr., Redwood City, CA (US); Patrick Elliott Perkins, Sunnyvale, CA (US); Lawrence Lowell Ames, San Jose, CA (US); William Walter Anderson, Half Moon Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 468 days.

(21) Appl. No.: 10/051,122

(22) Filed: Jan. 22, 2002

(65) Prior Publication Data

US 2003/0223674 A1 Dec. 4, 2003

(51) Int. Cl.[7] .............................. G02B 6/00; G02B 6/26; G02B 6/36
(52) U.S. Cl. ........................................ 385/15; 385/147
(58) Field of Search ............................. 385/15–24.147; 356/393, 494

(56) References Cited

U.S. PATENT DOCUMENTS

| | | | |
|---|---|---|---|
| 4,814,829 A | 3/1989 | Kosugi et al. | |
| 4,834,540 A | 5/1989 | Totsuka et al. | |
| 4,907,886 A | 3/1990 | Dandliker | |
| 4,912,530 A | 3/1990 | Bessho | |
| 5,694,216 A | 12/1997 | Riza | |
| 5,767,972 A | 6/1998 | Demarest | |
| 5,784,161 A | 7/1998 | Bechstein et al. | |
| 6,008,902 A | 12/1999 | Rinn | |
| 6,141,086 A | 10/2000 | Vahala et al. | |
| 6,163,379 A * | 12/2000 | de Groot | 356/493 |
| 6,236,507 B1 * | 5/2001 | Hill et al. | 359/494 |
| 6,240,235 B1 | 5/2001 | Uno et al. | |
| 6,243,168 B1 | 6/2001 | Heflinger et al. | |
| 6,542,682 B2 * | 4/2003 | Cotteverte et al. | 385/125 |
| 6,559,928 B1 | 5/2003 | Yamaguchi et al. | |
| 2001/0028461 A1 * | 10/2001 | Hill et al. | 356/493 |

OTHER PUBLICATIONS

J.D. Trolinger, Ultra High Resolution Interferometry, Proc. SPIE, vol. 2816, pp. 114–123, 1996.
T. Koybayashi et al., Optical FM Heterodyne Interferometry for Range and Displacement Measurements, CPEM '88 Digest, pp. 133–134, 1988.
M. Tanaka et al., Linear Interpolation of Periodic Error in Heterodyne Laser Interferometer at Subnanometer Levels, IEEE Trans. Inst. & Meas., vol. 38, pp. 552–554, 1989.
M. Tanaka et al., Linear Interpolation of Periodic 633nm in Heterodyne Laser Interferometer for Subnanometer Dimensional Measurement, CPEM '88 Digest, pp. 1310132, 1988.
Laser Interferometers/Encoders & Laser–Based Calibration Systems: Laser Interferometer Position Systems Product Catalog, pp. 538–539.
"Optics and Laser Heads for Laser–Interferometer Position Systems" Product Overview, Agilent Technologies (1995).

* cited by examiner

Primary Examiner—Akm Enayet Ullah
(74) Attorney, Agent, or Firm—McDermott Will & Emery LLP

(57) ABSTRACT

A method for performing optical signal and beam distribution in a heterodyne interferometer. A planar lightwave circuit is provided including a plurality of waveguide optical transmission elements and an input coupler and an output coupler arranged along the optical transmission elements. Optical pathlengths of the transmission elements are matched between the input coupler and the output coupler to compensate for thermal effects. Reference and measurement optical phases are determined employing the input coupler and the output coupler.

18 Claims, 11 Drawing Sheets

ROBUST HETERODYNE INTERFEROMETER OPTICAL GAUGE

FIELD OF THE INVENTION

The present invention relates to a robust heterodyne interferometer for very high resolution non-contact measurement of distances.

BACKGROUND OF THE INVENTION

Heterodyne Interferometry measures the phase of a continuous signal for as long as the signal remains stable over all portions of a reference path and a measurement path. The major practical problem with high resolution interferometry is that every optical pathlength change in the system, including the ones that are not intended, are measured. After the beams are split in the interferometer, movement of optical components, especially mirrors, add or subtract optical path length from one of the two beams separately, resulting in a signal that is unrelated to the measurement. Therefore, stability of optical components in the separate legs of the interferometer is critical, as described in J. D. Trolinger, *Ultra High Resolution Interferometry*, Proc. SPIE Vol. 2816, pp114–123 (1996).

Typically, existing heterodyne interferometer devices are subject to thermal drift errors that limit their performance. In addition, they consist of a precision assembly of critical components leading to high cost to manufacture. Therefore, a need exists for a robust, easily manufacturable device, which is immune to thermal drift errors.

SUMMARY OF THE INVENTION

The present invention replaces many of the optical components, their mountings and mechanically variable paths in a typical heterodyne interferometer with photolithographically defined components in an inherently stable single mode planar optical waveguide circuit. The waveguide circuit is a planar lightwave circuit (PLC) fabricated in silica on silicon. Such circuits are described in M. Kawachi, *Silica waveguides on silicon and their application to integrated-optic components*, Optical and Quantum Electronics, Vol. 22, pp391–416 (1990). Other material systems are possible but these have been chosen for their mechanical robustness, thermal stability, low coefficient of thermal expansion and commercial fabrication process maturity.

The present invention concerns a PLC containing at least two circulating optical waveguide circuits. The two circuits are non-interfering until combined at an output coupler. The circuit contains various waveguide couplers and splitters to provide measurement and reference signals to the output couplers. Circuit or waveguide paths on the PLC are photolithographically defined so that thermally induced pathlength differences between the two non-interfering circuits are precisely compensated. The PLC is incorporated into a system that contains a laser source or sources, a means of deriving two precisely separated optical frequencies from the laser source or sources, fiber optic connection of the two optical frequency signals to the PLC, means for coupling the measurement optical signal off of and back into the PLC and fiber coupling of the interfering optical signals output to optical intensity detectors.

Still other objects and advantages of the present invention will become readily apparent by those skilled in the art from a review of the following detailed description. The detailed description show and describes preferred embodiments of the present invention, simply by way of illustration of the best mode contemplated of carrying out the invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood from the following specification when considered in conjunction with the accompanying drawings, in which:

FIG. 7a represents a cross-sectional view of a section of the embodiment of the planar lightwave circuit shown in FIG. 7;

DETAILED DESCRIPTION OF THE INVENTION

The present invention provides a solution to problems existing with known devices. Along these lines, the present invention can provide a small, lightweight and robust optical gauge. A planar lightwave circuit (PLC) according to the present invention replaces large bulk components typically utilized in known devices. Use of the PLC according to the present invention results in smaller devices that are less sensitive or insensitive to thermal changes. Additionally, a device according to the present invention can be fiber coupled to inputs and outputs, such as sensors and light sources, and contains few components. Features of the present invention can permit devices according to the present invention to measure distance changes, for example, that are on the order of about one-millionth of the wavelength of light utilized in an application of the device.

The present invention can provide a device that can be utilized in the control of large structures by providing position, velocity, and acceleration data for control loops, characterization of turbulent flow by measuring velocity spectra, characterization of sound by measurement of motion of surfaces, among other variables. Due to its size, construction, and operating characteristic, the present invention is particularly suited to use for control of large, remotely controlled optical systems. Devices according to the present invention could also be utilized on assembly lines, where process controls require the non-contact control of positions and velocity. Devices according to the present invention are particularly useful where a rugged design is required.

Figure 1:
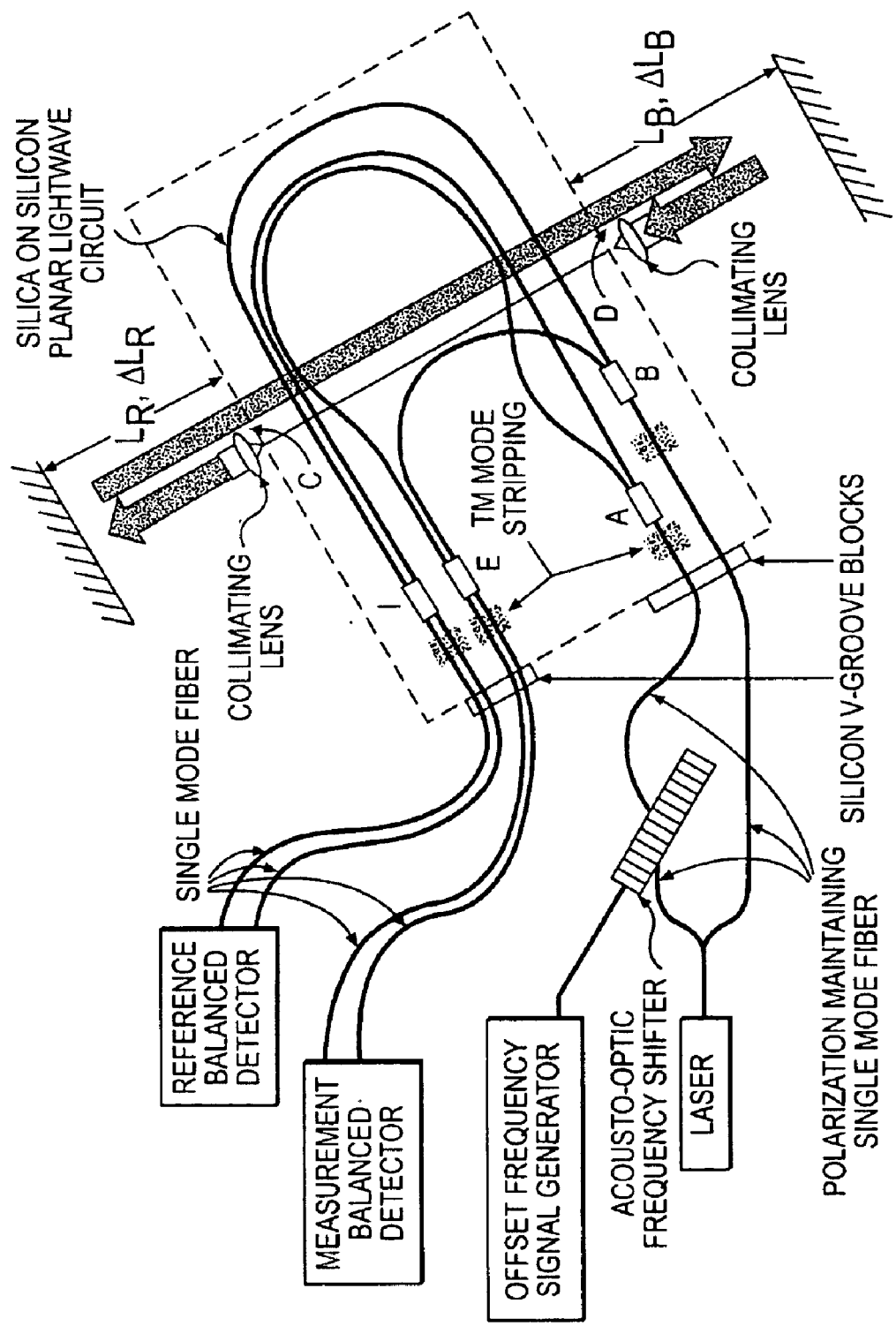
FIG. 1 represents an embodiment of a heterodyne interferometer according to the present invention wherein separate measurement and reference signals are obtained.

FIG. 1 illustrates an embodiment of a Planar Lightwave Circuit (PLC) according to the present invention. This type of circuit is also commonly referred to as a Photonic Integrated Circuit (PIC), a Lightwave Integrated Optic (LIO) circuit or an Integrated Optic (IO) circuit among other common nomenclatures in the literature. PLC fabrication technology has been developed in a number of material systems including glasses, polymers, lithium niobates and III–V semiconductors. Among the glasses are high silica ($SiO_2$) glasses with or without additional network former oxides such as $GeO_2$, $TiO_2$, $P_2O_5$ and/or $B_2O_3$. These glasses and the circuit components therein may be deposited onto various substrates such as silicon (Si) or quartz. ($SiO_2$).

The present invention will be described in terms of the silica on silicon technology due to the mature state of commercial development of this material system along with the desirable mechanical, optical and thermal properties of this material system. However, the present invention can be realized in any of the material systems available for PLC development. The silica on silicon PLC may be fabricated by any of the processes available for this material system including but not limited to flame hydrolysis deposition (FHD), vacuum deposition (VD) and various chemical vapor deposition processes (CVD) including low pressure CVD (LPCVD), atmospheric pressure CVD (APCVD) and plasma enhanced CVD (PECVD).

A PLC according to the present invention can include single mode optical waveguides with waveguide bends, waveguide crossings, waveguide couplers and waveguide splitters. The waveguide bends typically are constrained to radii of curvature sufficiently large to yield acceptably low radiation loss from the bends. This radiation loss will be determined by the refractive index difference between the waveguide core and cladding materials (the "index contrast") and will be fixed by the particular waveguide properties chosen. Waveguide crossing angles may be determined by a minimum crossing angle that provides an acceptably low level of crosstalk between the two crossing waveguides, which is a function of the index contrast. Minimum bend radii and minimum crossing angles may determine the minimum physical size of the PLC.

Waveguide couplers and/or splitters are identified in the embodiments of FIGS. 1–6 by the letters A, B, E, F, G, H and I. Splitters A, and B in FIGS. 1 and 2 along with splitters G and H in FIGS. 5 and 6 may be Y-branch splitters, directional couplers or multimode interference (MMI) devices. All output couplers, E, H and I, may be directional couplers or MMI devices to provide the indicated balanced output. Directional couplers only will be described in the various embodiments of the present invention although Y-branch or MMI devices represent examples of applicable alternatives.

FIG. 1 schematically represents one embodiment of a heterodyne interferometer incorporating a PLC. The PLC is within the rectangular region outlined by the broken line. The distance to be measured is the separation between mirrors $M_R$ and $M_B$. The measurement beam may be considered to enter the PLC at coupler B, traverse the path BC on the PLC, exit the PLC at C, pass though a collimating lens and reflect from mirror $M_R$ onto mirror $M_B$. From mirror $M_B$, the beam is reflected back onto the PLC at D after passing though another collimating lens. The beam then traverses path DE on the PLC and exits the PLC at coupler E.

The path length on the PLC of the measurement beam is BC+DE and the external path length of the measurement beam is $CM_R+M_RM_B+M_BD$. A reference path for the measurement beam is established by the path length BI. The phase of the measurement optical signal entering the PLC at coupler at B is uncontrolled and variable due to phase noise in the laser source, mechanical and thermal effects in the fiber coupling the laser to the PLC and coupling effects between the fiber and laser or PLC. This unknown and uncontrolled optical phase at the input to coupler B may be defined as $\phi_R(t)$.

The heterodyne optical signal may be considered to enter the PLC at coupler A. A portion of the beam exits the PLC through the measurement coupler output at E after traversing the pathlength AE on the PLC. In this embodiment, the path length AE is selected such that AE=BC+DE so that thermal variations of measurement signal path on chip are equal to thermal variations of heterodyne signal path. A reference path for the heterodyne optical signal may be established by the path length AI such that AI=BI so that thermal variations of these two optical paths are also matched.

The phase of the heterodyne optical signal entering the PLC at coupler at A may be uncontrolled and variable due to phase noise in the laser source, phase noise in the offset frequency generator, mechanical and thermal effects in the fiber coupling the laser to the acousto-optic frequency shifter, fiber coupling the acousto-optic frequency shifter to the PLC and coupling effects between the fibers and laser, acousto-optic frequency shifter or PLC. This unknown and uncontrolled optical phase at the input to coupler A may be defined as $\phi_B(t)$. The embodiment of an interferometer shown FIG. 1 and its corresponding PLC schematic shown in FIG. 2 will be referred to herein as a "Racetrack" configuration since the measurement beam exits the PLC at port C, traverses a loop around the PLC and reenters the PLC through port D. This configuration easily accommodates the required PLC pathlength equalities, AE=BC+DE and AI=BI, by appropriate location of the couplers A and B on the PLC along with an extra "bulge" in the path AE to lengthen the inside track of AE.

Figure 2:
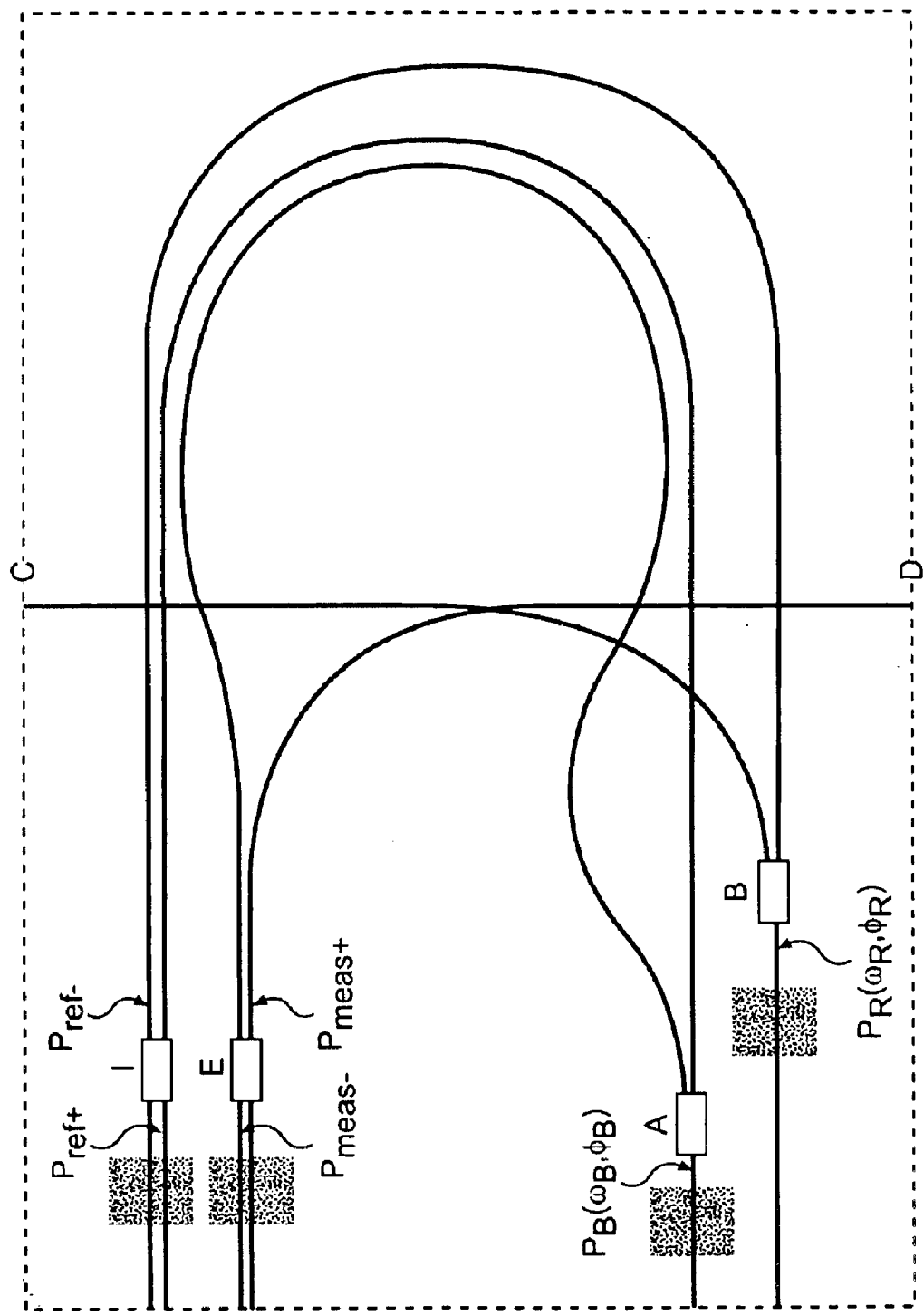
FIG. 2 represents a schematic drawing of an embodiment of a planar lightwave circuit included in the embodiment of a heterodyne interferometer represented in FIG. 1.

In the embodiment of FIGS. 1 and 2, the optical intensity interference pattern at the reference signal output coupler, I, is given by the following formula 1:

$$P_{ref\pm}=(P_R+P_B \mp 2\sqrt{P_RP_B}\cos[(\omega_R-\omega_B)t+(\phi_R-\phi_B)+(\theta_{BI}-\theta_{AI})])/4 \quad (1)$$

where $P_R$ is the optical power, $\omega_R$ is the optical frequency and $\phi_R(t)$ is the optical phase at the input to coupler B while $P_B$ is the optical power, $\omega_B$ is the optical frequency and $\phi_B(t)$ is the optical phase at the input to coupler A. Formula 1 does not assume that any optical loss will occur. Optical loss would only appear as a reduction in the values of $P_R$ and $P_B$. It would not affect the phase terms that are of interest in the heterodyne interferometer. The upper (minus) sign in the equation corresponds to the optical power in the upper waveguide exiting the coupler I while the lower (plus) sign corresponds to the optical power in the lower waveguide exiting the coupler I.

The phase terms, $\theta_{BI}$ and $\theta_{AI}$ correspond to the optical path lengths $\theta_{BI}=\omega_R n_{eff}BI/c$ and $\theta_{AI}=\omega_B n_{eff}AI/c$ where $n_{eff}$ is the effective refractive index of the guided optical waves and c is the velocity of light in vacuum. The difference of these two phase terms in the output heterodyne interference reference signal may be defined by the following formula 2:

$$\theta_{BI}-\theta_{AI}=n_{eff}(\omega_R BI-\omega_B AI)/c=\omega_R n_{eff}(BI-AI(1+\Delta\omega/\omega_R))/c \quad (2)$$

where $\Delta\omega$ is the offset frequency difference, $\omega_B-\omega_R$, of the signal driving the acousto-optic frequency shifter. Since $\omega_R\approx 1.2\times 10^{15}$ radians per second and $\Delta\omega\approx 10^5$ to $10^8$ radians per second, the term involving $\Delta\omega/\omega_R\approx 10^{-7}$ to $10^{-10}$ may be neglected. As a result, $\theta_{BI}-\theta_{AI}\approx\omega_R n_{eff}(BI-AI)/c\equiv\theta_I$ where $\theta_I$ is a small, temperature insensitive phase angle since $BI\approx AI$ by design.

A similar equation for the optical intensity interference pattern at the measurement signal output coupler, E, may be given by the following formula 3

$$P_{meas\mp}=(P_R+P_B\mp 2\sqrt{P_RP_B}\cos[(\omega_R-\omega_B)t+(\phi_{R-\phi B})+\theta_E+2\phi_L])/4 \quad (3)$$

where $\theta_E\equiv\theta_{BC+DE}-\theta_{AE}$ is a small, temperature insensitive phase angle since $AE\approx BC+DE$ by design and $2\phi_L=\omega_R(CM_R+M_RM_B+M_BD)/c$ contains the external path length of the measurement beam. Comparing the phases of the measurement optical signal interference pattern, $P_{meas\mp}$, and reference signal interference pattern, $P_{ref\mp}$, we see that the unknown, uncontrolled phase function, $\phi_R-\phi_B$ may be determined from $P_{ref\mp}$ and subtracted from the phase of $P_{meas\mp}$ to obtain $2\phi_L$.

Figure 3:
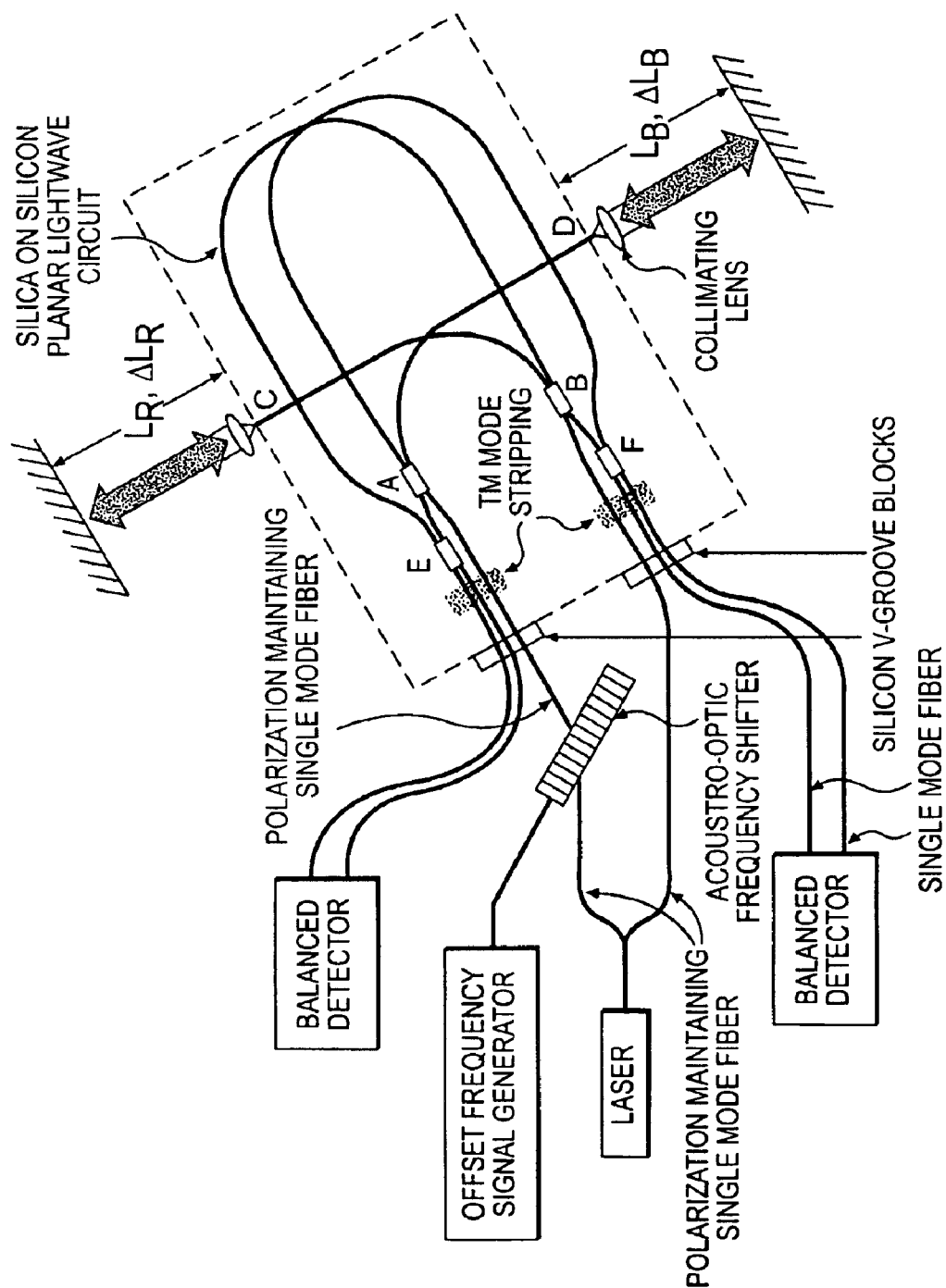
FIG. 3 represents another embodiment of a heterodyne interferometer according to the present invention wherein two measurement signals contain oppositely signed reference signals.
Figure 4:
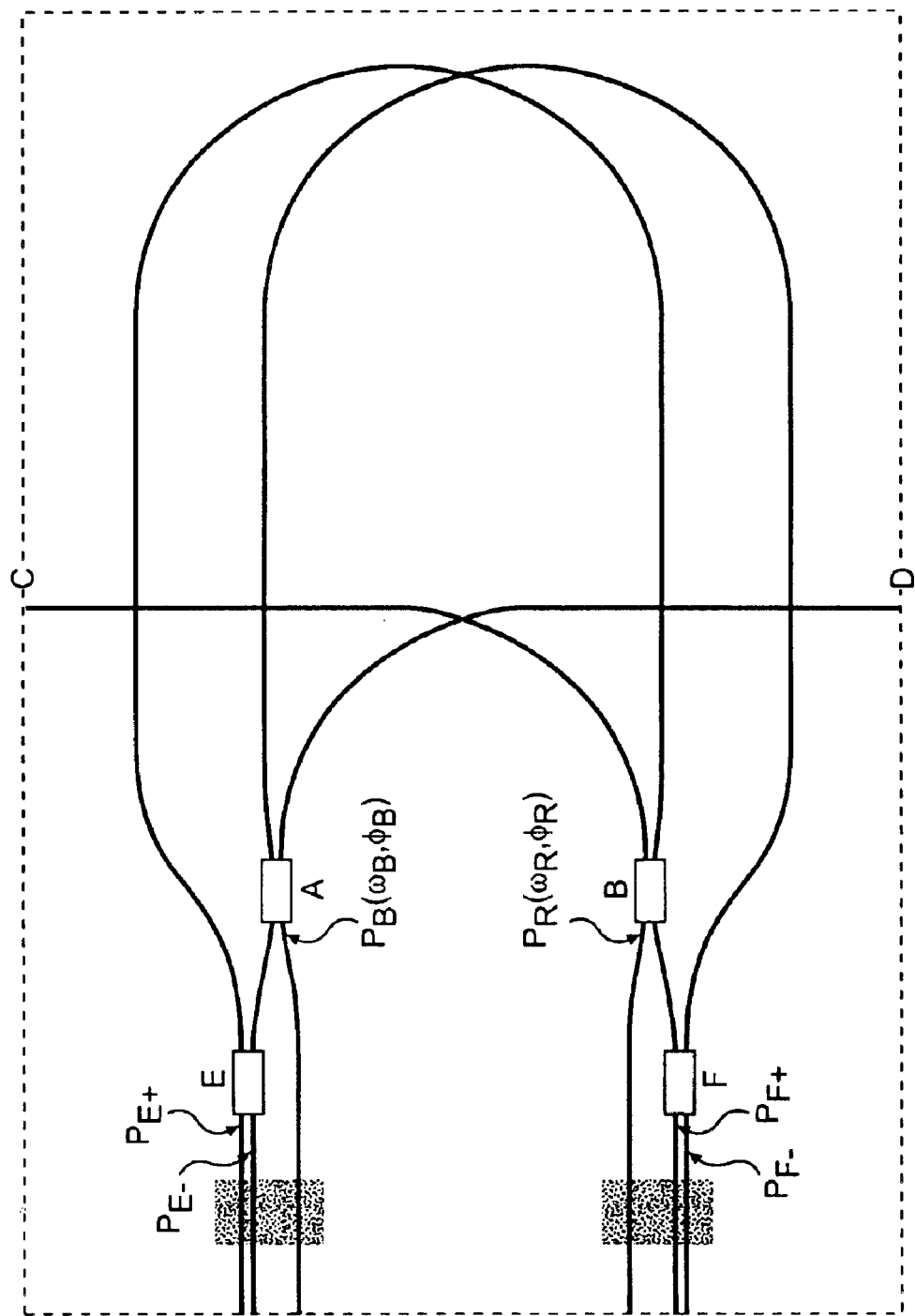
FIG. 4 represents a schematic drawing of an embodiment of a planar lightwave circuit included in the embodiment of a heterodyne interferometer represented in FIG. 3.

FIG. 3 schematically represents another embodiment according to the present invention of a heterodyne interferometer incorporating a PLC. The PLC is contained within the rectangular region defined by the broken line. FIG. 4 schematically represents the embodiment of the PLC circuit incorporated in the interferometer of FIG. 3. The distance to be measured is the sum of the distance from the PLC at C to the mirror at $L_R$ and the distance from the PLC at D to the mirror at $L_B$. One optical source may be considered to enter the PLC at coupler B with optical power, $P_R$, optical frequency, $\omega_R$, and optical phase, $\phi_R(t)$. In this embodiment, the phase of the measurement optical signal entering the PLC at coupler B, $\phi_R(t)$, is uncontrolled and variable due to phase noise in the laser source, mechanical and thermal effects in the fiber coupling the laser to the PLC and coupling effects between the fiber and laser or PLC. A second optical source may be considered to enter the PLC at coupler A with optical power, $P_B$, optical frequency, $\omega_B$, and optical phase, $\phi_B(t)$. In this embodiment, the phase of the measurement optical signal entering the PLC at coupler A, $\phi_B(t)$, is uncontrolled and variable due to phase noise in the laser source, phase noise in the offset frequency generator, mechanical and thermal effects in the fiber coupling the laser to the acousto-optic frequency shifter, the fiber coupling the acousto-optic frequency shifter to the PLC and coupling effects between the fibers and laser, acousto-optic frequency shifter or PLC.

One branch of the path of the measurement optical signal entering the PLC at B traverses the path BC, exits the PLC at C and after an external path of $2L_R$, reenters the PLC at C and traverses the path CBF to the output coupler at F. The pathlength of this signal on the PLC is 2BC+BF. One branch of the path of the measurement optical signal entering the PLC at A traverses the path AF to the output coupler at F. These two pathlengths are set equal, i.e. 2BC+BF=AF to compensate thermal effects on the PLC.

The other branch of the measurement optical signal entering the PLC at B traverses the path BE to the output coupler at E. The other branch of the measurement optical signal entering the PLC at A traverses the path AD, exits the PLC at D and after an external path of 2LB, reenters the PLC at D and traverses the path DAE to the output coupler at E. The pathlength of this signal on the PLC is 2AD+AE. These later two pathlengths are also set equal, i.e. 2AD+AE=BE to compensate thermal effects on the PLC. The interferometer of FIG. 3 and its corresponding PLC schematic shown in FIG. 4 are referred to herein as the "Trombone" since the required PLC pathlength equalities, 2BC+BF=AF and 2AD+AE=BE are easily accommodated by appropriate adjustment of the lengths of the horizontal straight segments in FIG. 4.

In the embodiment shown in FIGS. 3 and 4, the optical intensity interference pattern at the optical signal output coupler, E, may be defined by the following formula 4

$$P_{E\pm} = \frac{P_R}{4} + \frac{P_B}{8} \pm \frac{\sqrt{P_RP_B}}{2^{3/2}}\sin[(\omega_R - \omega_B)t + (\phi_R - \phi_B) + (\theta_{BE} - 2\theta_{AD} - \theta_{AE}) - 2\phi_{DL_R}] \quad (4)$$

where $P_R$ is the optical power, $\omega_R$ is the optical frequency and $\phi_R(t)$ is the optical phase at the input to coupler B while $P_B$ is the optical power, $\omega_B$ is the optical frequency and $\phi_B(t)$ is the optical phase at the input to coupler A as indicated in FIG. 4. No optical loss has been assumed in this expression. Optical loss would only appear as a reduction in the values of $P_R$ and $P_B$. It would not affect the phase terms that are of interest in the heterodyne interferometer. The upper (plus) sign in the equation corresponds to the optical power in the upper waveguide exiting the coupler E while the lower (minus) sign corresponds to the optical power in the lower waveguide exiting the coupler E.

The phase terms, $\theta_{BE}$ and $2\theta_{AD}+\theta_{AE}$ correspond to the optical path lengths $\theta_{BE}=\omega_R n_{eff}BE/c$ and $2\theta_{AD}+\theta_{AE}=\omega_B n_{eff}(2AD+AE)/c$, where $n_{eff}$ is effective refractive index of the guided optical waves and c is the velocity of light in vacuum. The difference of these two phase terms in the output heterodyne interference reference signal may be defined by the following formula 5

$$\theta_{BE}-2\theta_{AD}-\theta_{AE}=n_{eff}(\omega_R BE-\omega_B(2AD+AE))/c=\omega_R n_{eff}(BE-(2AD+AE)(1+\Delta\omega/\omega_R))/c \quad (5)$$

where $\Delta\omega$ is the offset frequency difference, $\omega_B-\omega_R$, of the signal driving the acousto-optic frequency shifter. Since $\omega_R\approx 1.2\times 10^{15}$ radians per second and $\Delta\omega\approx 10^5$ to $10^8$ radians per second, the term involving $\Delta\omega/\omega_R\approx 10^{-7}$ to $10^{-10}$ may be neglected. Also, $\theta_{BE}-2\theta_{AD}-\theta_{AE}\approx\omega_R n_{eff}(BE-(2AD+AE))/$ $c \equiv \theta_E$, where $\theta_E$ is a small, temperature insensitive phase angle since BE≈2AD+AE by design. The phase term $2\phi_{DL_B} = 2\omega_B L_B/c$ contains the round trip pathlength measurement from the PLC at exit point D to the lower mirror in FIG. 2 and back to point D.

A similar equation for the optical intensity interference pattern at the optical signal output coupler, F, is given by the following formula 6

$$P_{F\pm} = \frac{P_R}{4} + \frac{P_B}{8} \pm \frac{\sqrt{P_R P_B}}{2^{3/2}} \sin[(\omega_R - \omega_B)t + \quad (6)$$
$$(\phi_R - \phi_B) + (2\theta_{BC} + \theta_{BF} - \theta_{AF}) + 2\phi_{CL_R}]$$

where $\theta_F \equiv 2\theta_{BC} + \theta_{BF} - \theta_{AF}$ is a small, temperature insensitive phase angle since AF≈2BC+BF by design. The upper (plus) sign in the equation corresponds to the optical power in the upper waveguide exiting the coupler F while the lower (minus) sign corresponds to the optical power in the lower waveguide exiting the coupler F. The phase term $2\phi_{DL_R} = 2\omega_R L_R/c$ contains the round trip pathlength measurement from the PLC at exit point C to the upper mirror in FIG. 2 and back to point C. If the phase of the heterodyne signal out of coupler E is subtracted from the phase of the heterodyne signal out of coupler F, the result $2(\phi_{CL_R} + \phi_{DL_R}) + \theta_F - \theta_E$ is obtained, which contains the separation of the two mirrors plus two small, fixed, temperature insensitive terms, $\theta_F$ and $\theta_E$.

Figure 5:
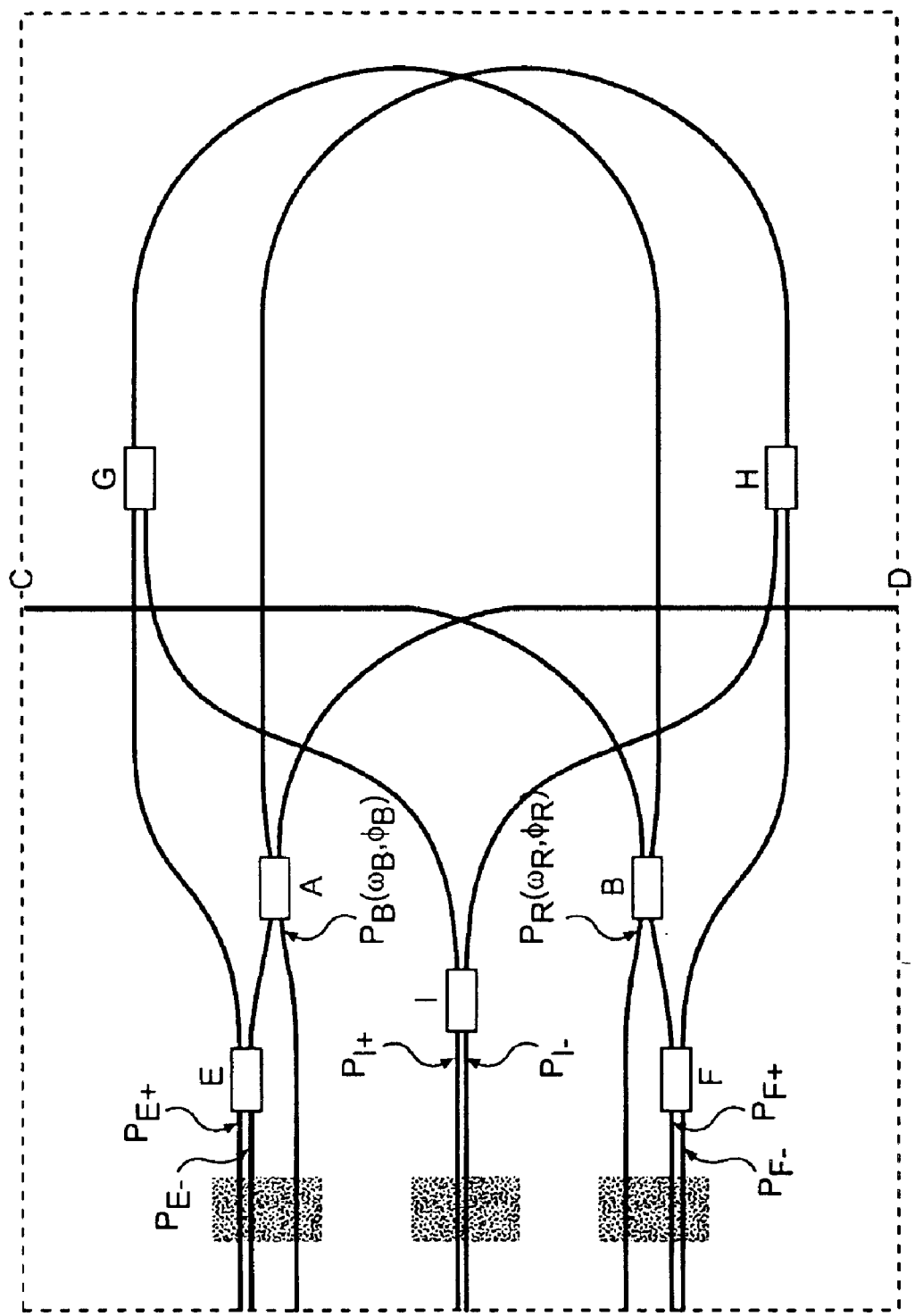
FIG. 5 represents a schematic drawing of an embodiment of a planar lightwave circuit including two measurement beams and an additional reference signal output.
Figure 6:
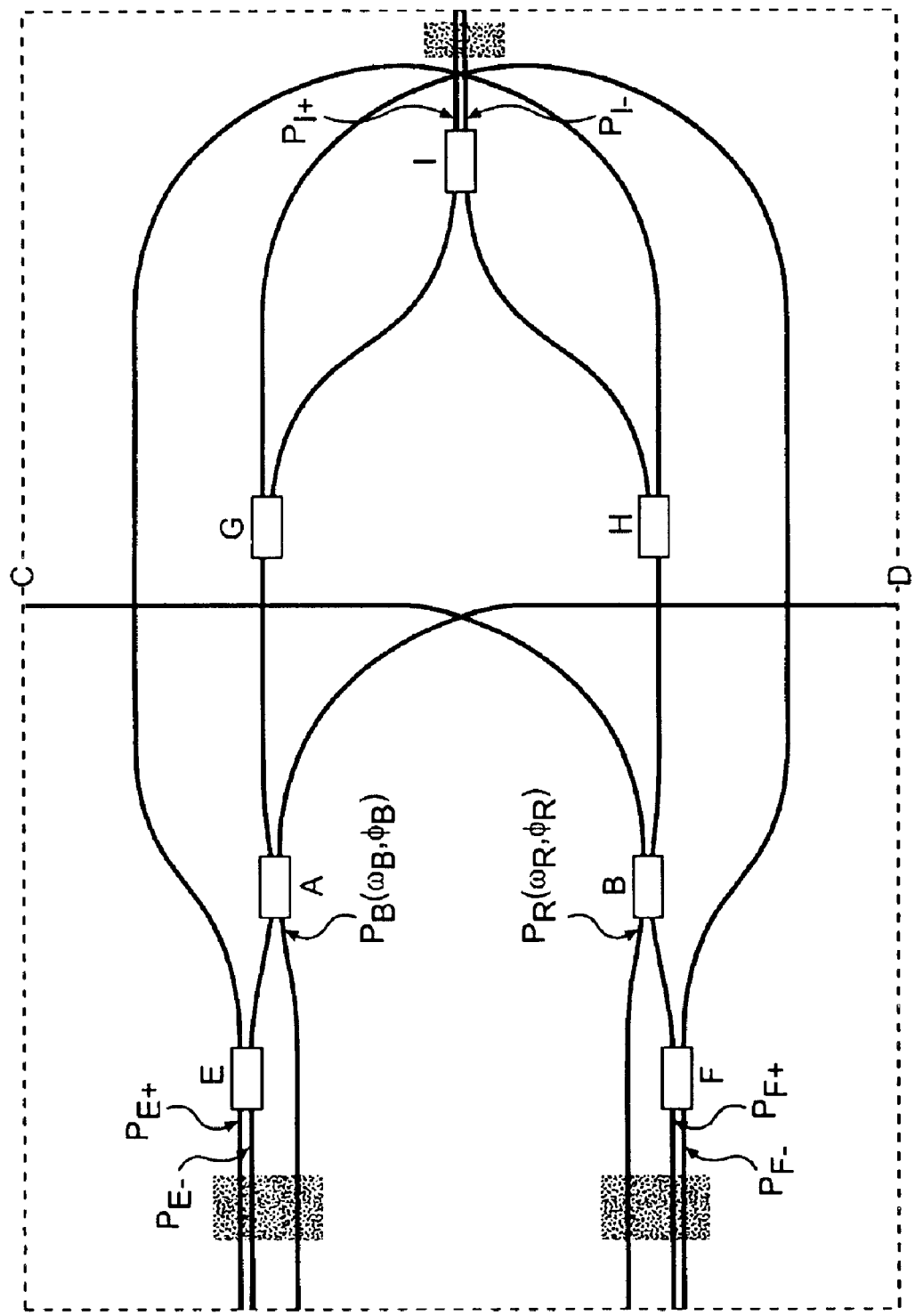
FIG. 6 represents a schematic drawing of another embodiment of a planar lightwave circuit including two measurement beams and an additional reference signal output as in the embodiment shown in FIG. 5 but with the reference output on the opposite side of the planar lightwave circuit from the embodiment shown in FIG. 5.

While the interferometer configuration shown in FIG. 3 is such that measurement of the sum of the two distances, $L_R$ and $L_B$ allows elimination of the uncontrolled phase fluctuations at the input couplers, $\phi_R - \phi_B$, it is also possible to add a separate measurement circuit to determine this quantity as shown the schematic representations of PLC circuits shown in FIGS. 5 and 6.

In FIG. 5, the additional couplers G and H are arranged such that the input phase signal is coupled out on the left side of the PLC. This embodiment is referred to herein as the "Lightbulb". The design and operation of this circuit is essentially the same as the "Trombone" except that some optical power is coupled out at I to provide the reference signal. If the optical signal inputs are as described for the Trombone, $P_R(\omega_R, \phi_R)$ into coupler B and $P_B(\omega_B, \phi_B)$ into coupler A, then the optical intensity interference pattern at the optical signal output coupler, E, is given by the following formula 7

$$P_{E\pm} = \frac{P_R}{8} + \frac{P_B}{8} \pm \frac{\sqrt{P_R P_B}}{4} \sin[(\omega_R - \omega_B)t + \quad (7)$$
$$(\phi_R - \phi_B) + (\theta_{BG+GE} - 2\theta_{AD} - \theta_{AE}) - 2\phi_{DL_R}]$$

The upper (plus) sign in the equation corresponds to the optical power in the upper waveguide exiting the coupler E while the lower (minus) sign corresponds to the optical power in the lower waveguide exiting the coupler E. The phase angle $\theta_{BG+GE} - 2\theta_{AD} - \theta_{AE} \equiv \theta_E$ is made small and temperature invariant or insensitive by setting the pathlengths BG+GE=2AD+AE.

The optical intensity interference pattern at the optical signal output coupler, F, is given by the following formula 8

$$P_{F\pm} = \frac{P_R}{8} + \frac{P_B}{8} \pm \frac{\sqrt{P_R P_B}}{4} \sin[(\omega_R - \omega_B)t + \quad (8)$$
$$(\phi_R - \phi_B) + (2\theta_{BC} + \theta_{BF} - \theta_{AH+HF}) + 2\phi_{CL_R}].$$

The upper (plus) sign in the equation corresponds to the optical power in the upper waveguide exiting the coupler F while the lower (minus) sign corresponds to the optical power in the lower waveguide exiting the coupler F. The phase angle $2\theta_{BC} + \theta_{BF} - \theta_{AH+HF} \equiv \theta_F$ is made small and temperature invariant or insensitive by setting the pathlengths 2BC+BF=AH+HF. Finally, the optical intensity interference pattern at the optical signal output coupler, I, is given by the following formula 9

$$P_{I\pm} = \frac{P_R}{8} + \frac{P_B}{8} \pm \frac{\sqrt{P_R P_B}}{4} \sin[(\omega_R - \omega_B)t + \quad (9)$$
$$(\phi_R - \phi_B) + \theta_{BG+GI} - \theta_{AH+HI})].$$

The upper (plus) sign in the equation corresponds to the optical power in the upper waveguide exiting the coupler I while the lower (minus) sign corresponds to the optical power in the lower waveguide exiting the coupler I. The phase angle $\theta_{BG+GI} - \theta_{AH+HI} \equiv \theta_I$ is made small and temperature invariant or insensitive by setting the pathlengths BG+GI=AH+HI. From the phase of this last equation, the unknown and uncontrolled phase term, $\phi_R - \phi_B$, may be obtained for an independent determination of $L_R$ and $L_B$ in the two preceding equations.

FIG. 6 illustrates an embodiment in which the additional couplers G and H are arranged such that the input phase signal is coupled out on the right side of the PLC. This embodiment is referred to herein as the "Jellyfish". The design and operation of this circuit is essentially the same as the Lightbulb. If the optical signal inputs are as described for the Trombone, $P_R(\omega_R, \phi_R)$ into coupler B and $P_B(\omega_B, \phi_B)$ into coupler A, then the optical intensity interference pattern at the optical signal output coupler, E, is given by the following formula 9

$$P_{E\pm} = \frac{P_R}{8} + \frac{P_B}{8} \pm \frac{\sqrt{P_R P_B}}{4} \sin[(\omega_R - \omega_B)t + \quad (9)$$
$$(\phi_R - \phi_B) + \theta_{BH+HE} - 2\theta_{AD} - \theta_{AE})] - 2\phi_{DL_R}].$$

The upper (plus) sign in the equation corresponds to the optical power in the upper waveguide exiting the coupler E while the lower (minus) sign corresponds to the optical power in the lower waveguide exiting the coupler E. The phase angle $\theta_{BH+HE} - 2\theta_{AD} - \theta_{AE} \equiv \theta_E$ is made small and temperature invariant or insensitive by setting the pathlengths BH+HE=2AD+AE.

The optical intensity interference pattern at the optical signal output coupler, F, is given by the following formula 10

$$P_{F\pm} = \frac{P_R}{8} + \frac{P_B}{8} \pm \frac{\sqrt{P_R P_B}}{4} \sin[(\omega_R - \omega_B)t + \quad (10)$$
$$(\phi_R - \phi_B) + (2\theta_{BC} + \theta_{BF} - \theta_{AG+GF}) + 2\phi_{CL_R}].$$

The upper (plus) sign in the equation corresponds to the optical power in the upper waveguide exiting the coupler F while the lower (minus) sign corresponds to the optical power in the lower waveguide exiting the coupler F. The phase angle $2\theta_{BC} + \theta_{BF} - \theta_{AG+GF} \equiv \theta_F$ is made small and temperature invariant or insensitive by setting the pathlengths 2BC+BF=AG+GF.

Finally, the optical intensity interference pattern at the optical signal output coupler, I, is given by the following formula 11

$$P_{I\pm} = \frac{P_R}{8} + \frac{P_B}{8} \pm \frac{\sqrt{P_R P_B}}{4}\sin[(\omega_R - \omega_B)t + (\phi_R - \phi_B) + \theta_{BH+HI} - \theta_{AG+GI}] \quad (11)$$

The upper (plus) sign in the equation corresponds to the optical power in the upper waveguide exiting the coupler I while the lower (minus) sign corresponds to the optical power in the lower waveguide exiting the coupler I. The phase angle $\theta_{BH+HI}-\theta_{AG+GI}\equiv\theta_I$ is made small and temperature invariant or insensitive by setting the pathlengths BH+HI=AG+GI. From the phase of this last equation, the unknown and uncontrolled phase term, $\phi_R-\phi_B$, may be obtained for an independent determination of $L_R$ and $L_B$ in the two preceding equations.

Figure 7:
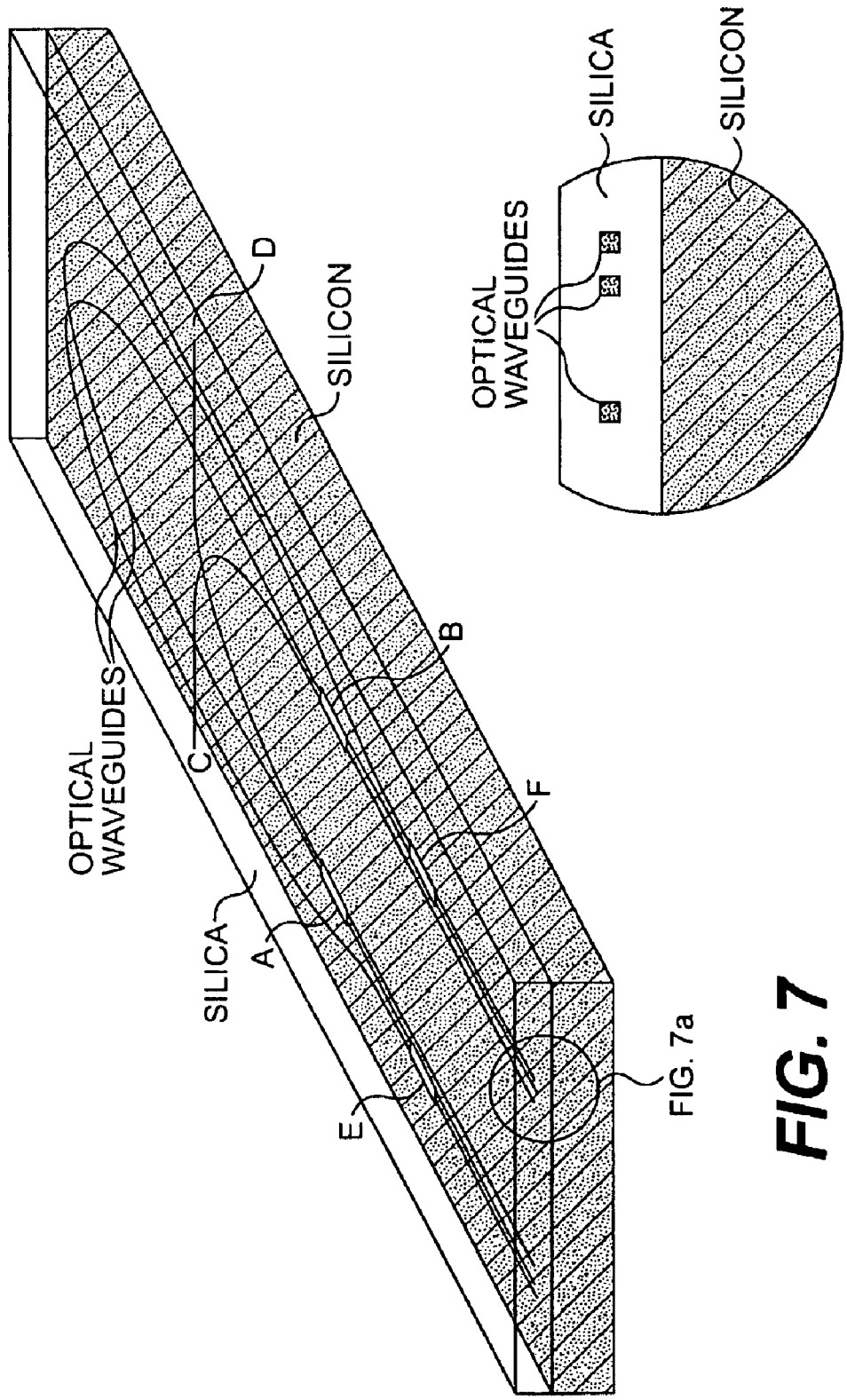
FIG. 7 represents a perspective partially cut-away view of an embodiment of a planar lightwave circuit according to the present invention as represented in FIGS. 3 and 4.

Aspects of the present invention provide unique properties in various applications. For example, the present invention can provide a number of unique properties in the fabrication process. Along these lines, the present invention may be employed to replace a number of discreet, precision optical components and the attendant assembly process with a single component manufactured with standard industrial processes which have grown out of a combination of optical fiber fabrication technology and microelectronic large scale integration technology. FIG. 7 illustrates a perspective view of an embodiment of the PLC described in conjunction with FIGS. 3 and 4. If a planar lightwave circuit according to the present invention employs telecom industry wavelengths, there is no change in nor perturbation to standard PLC process lines. Only the photolithographic mask to define the specific circuit is required as a special item.

The optical waveguide size and minimum bending radii may be determined by the specific index contrast utilized in a particular fabrication facility or process. Representative values are given in Table 1 from M. Kawachi, *Recent progress in silica-based planar lightwave circuits on silicon*, IEE Proc.-Optoelectron., Vol. 143, pp. 257–262 (1996).

TABLE 1

Silica on Silicon Waveguide Parameters

| Waveguide type | Low Δ | Middle Δ | High Δ |
| --- | --- | --- | --- |
| Core/cladding index contrast Δ(%) | 0.25 | 0.45 | 0.75 |
| Core size, μm | 8 × 8 | 7 × 7 | 6 × 6 |
| Loss, dB/cm | <0.1 | <0.1 | <0.1 |
| Fiber coupling loss, dB/point | <0.1 | 0.1 | 0.5 |
| Minimum bending radius, mm | 25 | 15 | 5 |

From the PLC circuits laid out as schematically indicated in FIGS. 2 and 4–6, the minimum bending radii given in Table 1 will establish typical minimum PLC circuit dimensions of greater that about 5 cm by about 5 cm for a low contrast process to about 1 cm by about 1 cm for a high contrast process since all circuits involve arcs of about 90° or about 180° in various orientations.

The total thickness of glass on the silicon substrate typically varies from about 10 to about 50 μm. This thickness is dependent on the established processes of various manufacturers and does not affect the operation of the PLC. It may, however, influence the post process fabrication of TM mode stripping structures as discussed below.

In the analysis, it was assumed that critical phase relations were established at the input couplers (A and B in FIGS. 1–6) and persisted only through the output couplers (E, F and I in the Figures). This is true since the phase of the two signals exiting coupler A are fixed with respect to one another at the input of coupler A as are the two signals exiting coupler B fixed with respect to one another at the input of coupler B. When the signals exit the couplers E, F or I, the phase of the heterodyne or beat note between the two signals is established and no further interaction occurs. Thus, the entire heterodyne interaction occurs in the robust, monolithic, photolithographically defined structure of silica on silicon.

Figure 8:
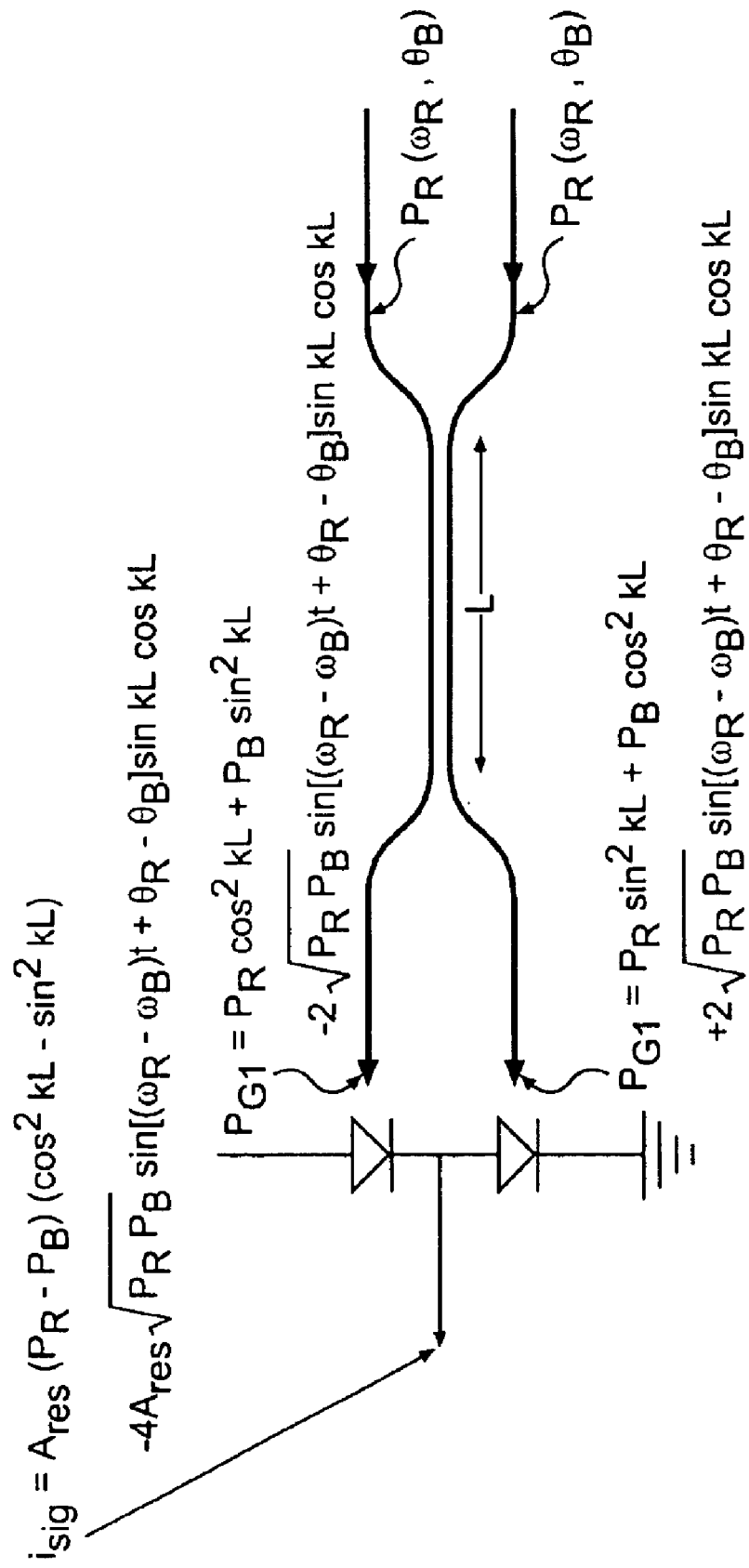
FIG. 8 represents a schematic drawing of an embodiment of a balanced detector common to the some embodiments of balanced outputs of variations of planar lightwave circuits and corresponding versions of heterodyne interferometers as represented in FIGS. 1–6.

Other advantages of the present invention are achieved through the balanced detection possible. The discussion above assumes that all couplers, combiners or splitters were 50::50. The output couplers should all be 50::50 for balanced detection optimization. However, there may be advantages to using to using other splitting ratios in certain cases. For example, FIG. 8 schematically represents the output of a balanced detector as being the difference in photocurrents generated in two series connected photodiodes. The input optical powers are $P_R(\omega_R, \theta_R)$ to the upper waveguide and $P_B(\omega_B, \theta_B)$ to the lower waveguide. The coupling of energy from the lower to upper waveguide and visa versa is dependent upon the coupling constant between the waveguides and the length of the interacting region. There is a sinusoidal variation of the coupling with length and coupling constant as indicated in FIG. 8. If the coupling constant and interaction length are such that $kL=\pi/4$, then the coupling ratio is 50::50 and the photocurrent, $i_{sig}$, in the balanced detector contains only the beat frequency or heterodyne term. Also, with the photoresponce of the photodetectors, $A_{res}$ amps/watt, identical for both the upper and lower photodiodes in FIG. 8, the output signal current is maximum for $kL=\pi/4$, $i_{sig}=-2A_{res}\sqrt{P_R P_B}\sin[(\omega_R-\omega_B)t+\theta_R-\theta_B]$. Further more, if the total optical power into the coupler, $P_{opt}=P_R+P_B$ is fixed, then the signal current is maximized for $P_R=P_B=P_{opt}/2$.

If the total input optical power to the PLC is fixed by the common source laser indicated in FIG. 1 or 3 but the optical loss in one channel is excessive (typically in the measurement paths to the external mirrors), then further circuit optimization may be possible by adjusting the coupling ratios of the input couplers, A and B. In the case of the racetrack circuit, FIGS. 1 and 2, the input coupler splitting ratio may be designed to provide excess power into the measurement circuit. In the case of the lightbulb and jellyfish circuits shown in FIGS. 5 and 6, the reference splitters may be designed to optimize the division of power between the reference output port at I and the measurement ports at E and F.

Further advantages of the present invention relate to temperature insensitivity of the devices. In the description of the various embodiments of the PLC circuit, certain path lengths were set equal to minimize thermal effects. These are summarized in Table 2. In every case, the small phase off-set terms may be written as $(\omega_R n_{eff}/c)[\Delta L-L\Delta\omega/\omega_R]$ or $(2\pi n_{eff}/\lambda_{oR})[\Delta L-L\Delta\omega/\omega_R]$ where $\lambda_{oR}$ is the free space wavelength of the optical signal at frequency $\omega_R$.

TABLE 2

Phase imbalance or off-set terms

| Circuit | Matching Paths | Phase Off-set |
|---|---|---|
| Racetrack FIGS. 1–2 | AE = BC + DE | $\theta_E = \omega_R n_{eff}[BC + DE - AE(1 + \Delta\omega/\omega_R)]/c$ |
|  | AI = BI | $\theta_I = \omega_R n_{eff}[BI - AI(1 + \Delta\omega/\omega_R)]/c$ |
| Trombone FIGS. 3–4 | BE = 2AD + AE | $\theta_E = \omega_R n_{eff}[BE - (2AD + AE)(1 + \Delta\omega/\omega_R)]/c$ |
|  | AF = 2BC + BF | $\theta_F = \omega_R n_{eff}[2BC + BF - AF(1 + \Delta\omega/\omega_R)]/c$ |
| Lightbulb FIG. 5 | BG + GE = 2AD + AE | $\theta_E = \omega_R n_{eff}[BG + GE - (2AD + AE)(1 + \Delta\omega/\omega_R)]/c$ |
|  | AH + HF = 2BC + BF | $\theta_F = \omega_R n_{eff}[2BC + BF - (AH + HF)(1 + \Delta\omega/\omega_R)]/c$ |
|  | AH + HI = BG + GI | $\theta_I = \omega_R n_{eff}[BG + GI - (AH + HI)(1 + \Delta\omega/\omega_R)]/c$ |
| Jellyfish FIG. 6 | BH + HE = 2AD + AE | $\theta_E = \omega_R n_{eff}[BH + HE - (2AD + AE)(1 + \Delta\omega/\omega_R)]/c$ |
|  | AG + GF = 2BC + BF | $\theta_F = \omega_R n_{eff}[2BC + BF - (AG + GF)(1 + \Delta\omega/\omega_R)]/c$ |
|  | AG + GI = BH + HI | $\theta_I = \omega_R n_{eff}[BH + HI - (AG + GI)(1 + \Delta\omega/\omega_R)]/c$ |

The length $\Delta L$ for example BC+DE−AE in the first line of Table 2 may easily be maintained at less than about 5 micrometers by the photolithographic design/fabrication process, including the location of the PLC edges at C and D in FIGS. 1–6. The edges of the PLC may be identified by a series of fiducial lines included on the photolithographic mask and precision edge polishing following PLC fabrication. The properties of silica on silicon PLCs is such that the thermal coefficient of optical path length changes in a silica-based waveguide is $$\frac{1}{\Delta L}\frac{d}{dT}(n_{eff}\Delta L) = 1 \times 10^{-5} [1/^\circ C.]$$

so that if $\Delta L \leq$ about 5 $\mu$m, $\delta\Delta L \leq$ about $5\times 10^{-5}\delta T$ $\mu$m. A change in temperature of approximately one degree Celsius will result in only about 50 picometers of PLC unbalance change.

From the embodiments of heterodyne interferometer PLCs indicated in FIGS. 2 and 4–6, the PLC optical path lengths of all paths from A or B to E, F, or I will be $L \sim 2\pi R_{min}$, where $R_{min}$ is the minimum radius of curvature from Table 1. Since $5 \leq R_{min} \leq 25$ mm and $10^{-10} \leq \Delta\omega/\omega_R \leq 10^{-7}$, the maximum thermal contribution of the $n_{eff}L\Delta\omega/\omega_R$ term to the optical pathlength change will be $\delta L \leq 1.6 \times 10^{-8}\delta T$ micrometers. A temperature change of about one degree Celsius will result in only about 0.016 picometers of PLC unbalance change, which is completely negligible compared to the thermal effects associated with $\Delta L$ changes.

Still further advantages of the present invention relate to immunity of devices according to the present invention from spurious signals. Spurious signals at the output couplers at the two frequencies $\omega_R$ and $\omega_B$, which have traversed paths other than the intended path will introduce measurement errors. These spurious signals may arise from reflections (especially at PLC interfaces with the external world), cross coupling (at waveguide crossings) and polarization mode dispersion.

Figure 9A:
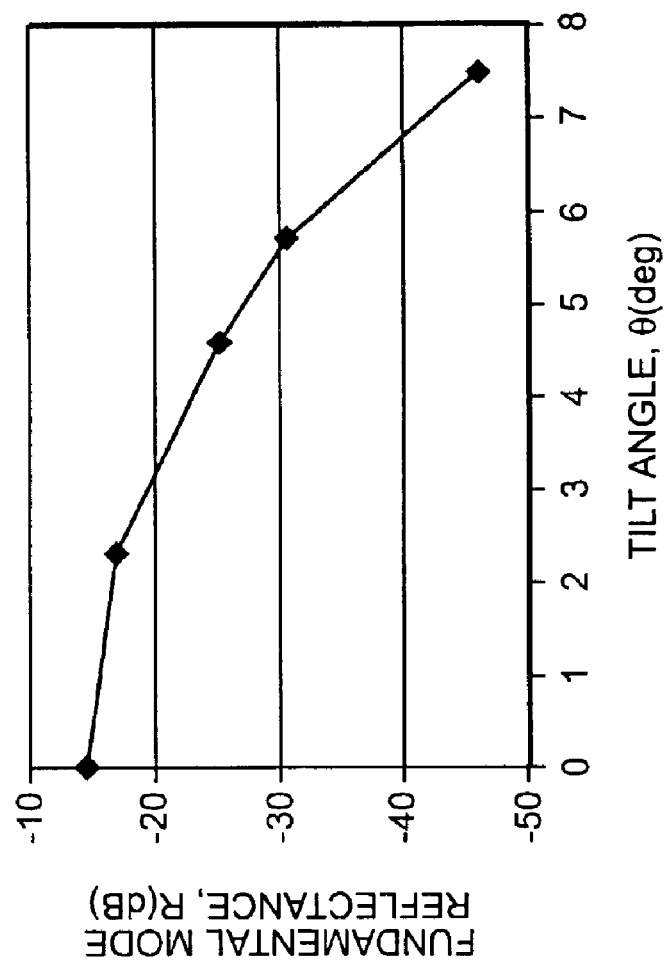
FIG. 9a represents a cross-sectional view of a portion of a planar lightwave circuit on which the calculations shown in FIG. 9 were made.
Figure 9:
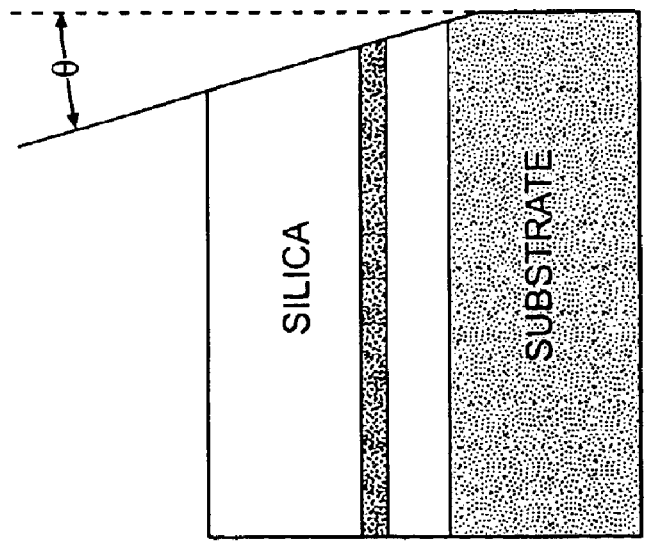
FIG. 9 represents a graph that illustrates calculations demonstrating the effectiveness of reflected signal reduction at angled interfaces.
Figures 10, 10A:
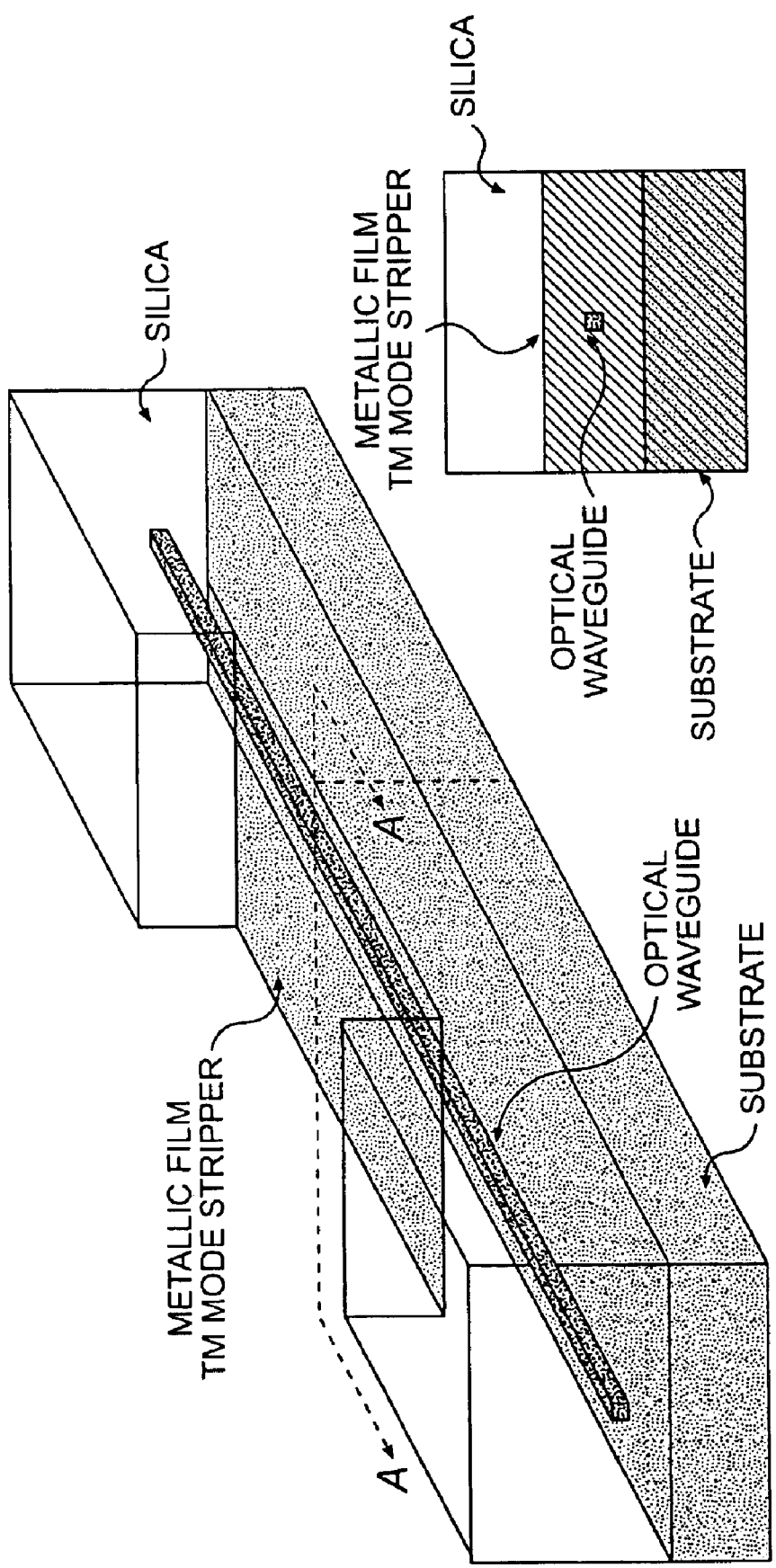
FIG. 10 represents a perspective partially cut-away view of an embodiment of a TM mode stripper incorporated into a planar lightwave circuit according to the present invention as represented in FIGS. 1–6.
FIG. 10a represents a cross-sectional view of the embodiment of a TM stripper shown in FIG. 10 along the line A—A.
Figure 12:
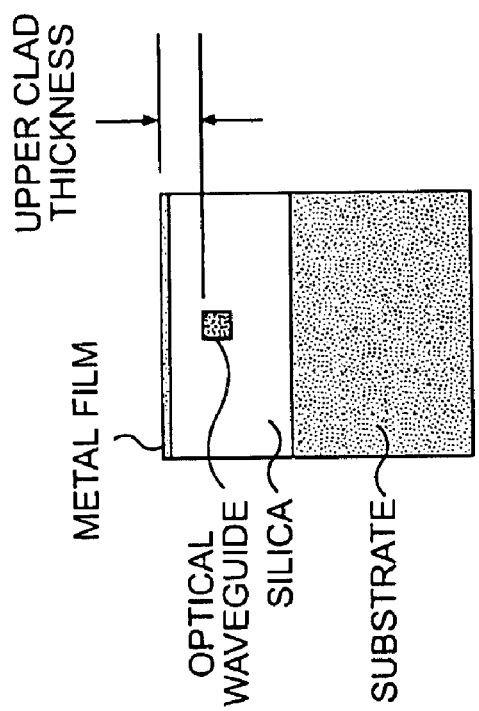
FIG. 12 represents a cross-sectional view of a portion of a planar lightwave circuit on which the calculations shown in FIG. 11 were taken.

The use of "angle lapping" is well known in the fiber optic industry to reduce reflections at fiber-fiber interfaces. This technique is also used for fiber-PLC interfaces. An additional interface refection reduction at fiber-PLC interfaces is accomplished by the use of index matching bonding agents at the silicon V-block fiber assembly structures indicated in FIGS. 1 and 3. For the heterodyne interferometer, reflection reduction at the PLC-free space interfaces, ports C and D in the embodiments shown in FIGS. 1–7, by angle lapping will result in reflection reduction as indicated in FIG. 9. Further reduction may be achieved by anti-reflection coating of the PLC-free space interface.

Single mode optical fibers and single mode waveguides in PLCs may sustain two orthogonal polarizations that may propagate at slightly different velocities. It may therefore be necessary to preferentially excite only one polarization mode at each input port, such as ports A and B in the embodiments shown in FIGS. 1–7, and to remove any optical power scattered from the desired mode into the orthogonal mode in the interferometer. This "mode stripping" operation may be accomplished at the output ports, such as ports E, F and I in the embodiments shown in FIGS. 1–7.

Figure 11:
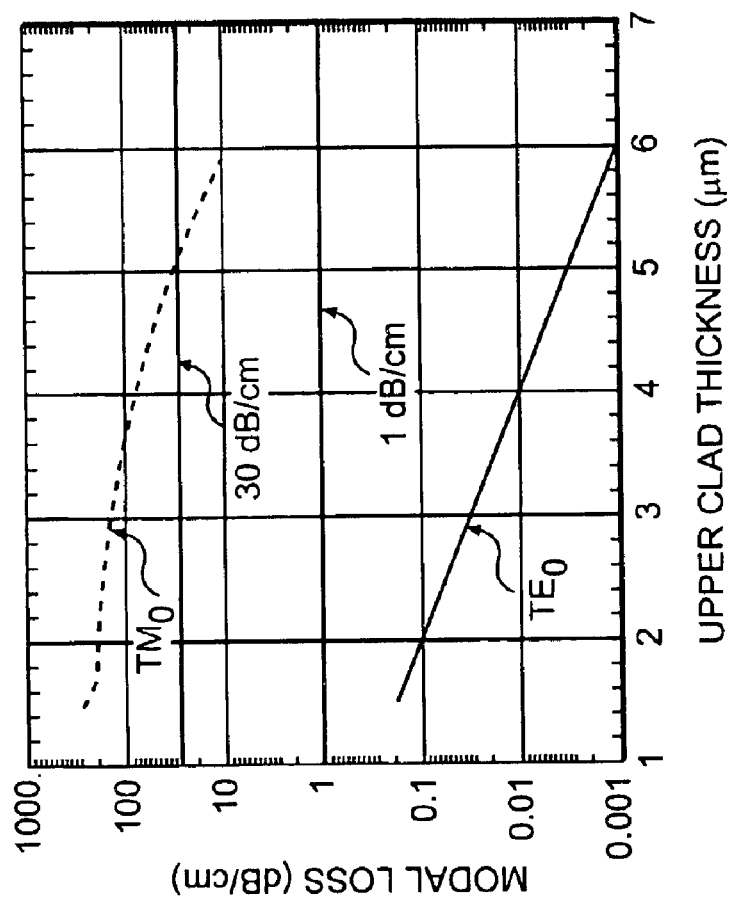
FIG. 11 represents a graph that illustrates calculations illustrating the effectiveness of the TM mode stripper as a function of optical waveguide to metal film separation.

Preferential excitation of the desired mode may be accomplished by transporting the polarized source light to the PLC by polarization maintaining fibers as indicated in FIGS. 1 and 3. A mode stripping structure may be fabricated in PLCs as indicated in FIG. 11. This structure can operate on the differing optical currents associated with the TE and TM modes that are induced in a metallic conductor. The TM optical mode is characterized by a large transverse optical frequency magnetic field oriented parallel to the plane of the PLC while the TE optical mode is characterized by a large optical frequency magnetic filed oriented perpendicular to the plane of the PLC. The tangential magnetic field induces optical currents in adjacent metallic conductors. FIG. 11 illustrates optical attenuation in the TM and TE modes of a high $\Delta n$ single mode waveguide due to an Al metal film. The thick top waveguide cladding layer may be thinned to the desired depth by various processes such as reactive ion etching, ion beam milling and/or wet chemical etching. The chosen etch procedure may be adjusted to provide a smooth surface for the depostion of the metallic film. The chosen example metal, Al, was selected due to the large magnitude of both the real, n, and imaginary, k, components of the optical index for Al at a wavelength of about 1.56 $\mu$m. These mode stripping patches may be located outside of the critical PLC paths before the input couplers A and B and after the output couplers E, F, and I in FIGS. 1–7.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A device operable to distribute optical signals and beams in a heterodyne interferometer, the device comprising:
   a planar lightwave circuit comprising a plurality of waveguide optical transmission elements; and an input coupler and an output coupler arranged along the optical transmission elements and operable to determine reference and measurement optical phases, wherein optical pathlengths of the optical transmission elements between the input coupler and the output coupler are matched to compensate for thermal effects.

2. The device according to claim 1, wherein the couplers comprise optical waveguide directional couplers.

3. The device according to claim 1, wherein the couplers comprise multimode interference devices.

4. The device according to claim 1, wherein the couplers comprise waveguide Y-branch couplers.

5. The device according to claim 1, wherein the output coupler comprises a waveguide directional coupler having 50:50 splitting ratio.

6. The device according to claim 5, wherein the output coupler is operable to provide a differential output appropriate for balance detection.

7. The device according to claim 2, wherein the output coupler is operable to provide a differential output appropriate for balanced detection.

8. The device according to claim 1, wherein the output coupler comprises a 2×2 multimode interference device operable to provide a differential output for balanced detection.

9. The device according to claim 1, wherein the output coupler comprises a 2×1 combiner operable to provide a single ended output.

10. The device according to claim 1, wherein at least one of the input couple and the output coupler is operable to split off a reference phase signal.

11. The device according to claim 1, wherein at least one of the input coupler has a coupling ratio operable to optimize a detected heterodyne output signal when encountering unequal losses in measuring optical paths or reference optical paths.

12. The device according to claim 1, wherein the optical transmission elements are embedded in a silica layer.

13. The device according to claim 1, wherein the substrate is silicon.

14. The device according to claim 1, wherein the substrate is quartz.

15. The device according to claim 1, wherein the planar lightwave circuit comprises at least one of a polymer, a III–V semiconductor, silicon and lithium mobate.

16. The device according to claim 1, wherein the planar lightwave circuit further comprises:

crossings of the waveguide optical transmission elements, the waveguide crossings being operable for application specific required minimal crosstalk.

17. The device according to claim 1, further comprising:

selected mode polarization strippers arranged at an input port and an output port of the planar lightwave circuit.

18. The device according to claim 17, wherein the TM polarization mode is selectively stripped off at the input and output ports by the use of optical evanescent H-field induced currents in an appropriately positioned metal above or below the optical waveguide.

* * * * *

UNITED STATES PATENT AND TRADEMARK OFFICE
CERTIFICATE OF CORRECTION

PATENT NO.     : 6,947,621 B2
DATED          : September 20, 2005
INVENTOR(S)    : Raymond M. Bell, Jr. et al.

It is certified that error appears in the above-identified patent and that said Letters Patent is hereby corrected as shown below:

Title page,
Item [56], References Cited, U.S. PATENT DOCUMENTS,
"6,559,928" should read -- 6,559,926 --.

Column 13,
Line 18, "balance" should read -- balanced --; and
Line 29, "couple" should read -- coupler --.

Signed and Sealed this

Twenty-fourth Day of January, 2006

JON W. DUDAS
*Director of the United States Patent and Trademark Office*